United States Patent [19]

Johnson et al.

[11] Patent Number: 5,138,546
[45] Date of Patent: Aug. 11, 1992

[54] SINTERED TRANSFORMER CORE OF MNZN-FERRITE AND A TRANSFORMER COMPRISING SUCH A CORE

[75] Inventors: Mark T. Johnson; Arjan Noordermeer; Marijke M. E. Severin; Eelco G. Visser, all of Eindhoven, Netherlands

[73] Assignee: U.S. Philips Corp., New York, N.Y.

[21] Appl. No.: 710,270

[22] Filed: Jun. 4, 1991

[30] Foreign Application Priority Data

Jun. 8, 1990 [NL] Netherlands ............... 9001297

[51] Int. Cl.⁵ .................. H01F 27/255; H02M 7/48
[52] U.S. Cl. ........................ 363/131; 252/62.54; 336/233; 363/20
[58] Field of Search .......... 363/20, 131; 336/233; 252/62.54

[56] References Cited

U.S. PATENT DOCUMENTS 4,502,982 · 3/1985 Horie et al. .............. 252/62.54
4,943,793 7/1990 Ngo et al. ................ 336/233

FOREIGN PATENT DOCUMENTS 1302992 4/1971 Fed. Rep. of Germany ...... 336/233

OTHER PUBLICATIONS

Agajanian et al, "High Frequency Mn-Zn Ferrites and Method of Their Preparation", IBM Tech. Discl. Bul., vol. 10, No. 5, p. 619, Oct. 1967.

Primary Examiner—William H. Beha, Jr.
Attorney, Agent, or Firm—William L. Botjer

[57] ABSTRACT

The invention relates to a sintered transformer core of MnZn-ferrite material, the initial permeability of which ranges between 10 and 1000. Said transformer cores preferably have an average particle size which ranges between 0.05 and 2.0 μm. The transformer cores according to the invention exhibit surprisingly low overall losses when operating in the frequency range of 2 MHz and higher. Such transformer cores can be very advantageously used in transformers operated in said frequency range, such as SMPS transformers.

5 Claims, 1 Drawing Sheet

SINTERED TRANSFORMER CORE OF MNZN-FERRITE AND A TRANSFORMER COMPRISING SUCH A CORE

BACKGROUND OF THE INVENTION

The invention relates to a sintered transformer core of MnZn-ferrite material. The invention further relates to a transformer comprising such a core. By means of a transformer the voltage and/or current of a current source can be transformed into a desired different voltage and/or current.

A transformer core of the type mentioned in the opening paragraph is known per se. Said core consists of sintered MnZn-ferrite which is described under code number 3C85 in Philips' Data Handbook C4, 1986, page 13. The sintered ferrite material of the known transformer core has an average grain size of 9 $\mu$m and exhibits an initial permeability ($\mu_i$) of 2000. The initial permeability is measured under standard conditions, i.e. at room temperature and 4 kHz. The known transformer core exhibits optimum properties when it is operated at frequencies of approximately 100 kHz and an induction of 100 mT. Under said conditions, in particular, the so-called overall losses (P) are relatively low, i.e. below 250 mW/cm$^3$. Said low losses can be ascribed to the high initial permeability of the ferrite material.

The known transformer core exhibits disadvantages. It has been found that the overall losses increase considerably when the core is used in the MHz-frequency range, more particularly in the range of 2 MHz and higher. The overall losses of the known core are 410 mW/cm$^3$ at 3 MHz (induction 10 mT) and even 800 nW/cm$^3$ at 10 mHz (induction 5 mT). These relatively large losses cause a strong heating up of the transformer core and transformer housing. Consequently, the known core is less suitable for use in transformers which are operated in the frequency range of 2 MHz and higher.

SUMMARY OF THE INVENTION

It is an object of the invention to provide, inter alia, a transformer core having low overall losses in the MHz-frequency range and, more particularly, in the frequency range of 2 MHz and higher. Said overall losses should preferably be smaller than 200 mW/cm$^3$. A further object of the invention is to provide a transformer which can be operated in the MHz-frequency range at low heat losses.

These and other objects are achieved by means of a transformer core of the type described in the opening paragraph, which is characterised according to the invention in that the initial, relative permeability of the sintered ferrite material ranges between 10 and 1000 and in that at a frequency in the range of 2 MHz and higher and a f.B.-product of at least 30 mT.MHz the overall losses are smaller than 200 mW/cm$^3$. The transformer core according to the invention exhibits surprisingly low overall losses when it is operated at a specific frequency in the frequency range of 2 MHz and higher. The overall losses are found to be intolerably high when the initial, relative permeability is greater than 1000. In that case, there is no frequency in this range at which such a transformer core can be operated at low overall losses below 200 mW/cm$^3$. In the case of transformer cores having an initial, relative permeability smaller than 10, there is an unacceptably high electromagnetic irradiation to the surroundings (air). The f.B.-product (mT.MHz) is a standard measuring criterion which complies with a CECC standard. According to sai criterion, the product of induction (mT) and frequency (MHz) must be minimally 30.

The invention is also based on a better insight into the losses which may occur in transformer cores. The overall losses, causing the generation of heat in transformer cores, consist of two contributions, i.e., electrical losses (eddy currents) and magnetic losses. Said magnetic losses are composed of hysteresis losses and the so-called residual losses. Until now, it was assumed that the hysteresis losses contribute most to the overall losses. It is known that the extend of the hysteresis losses is inversely proportional to the innital, relative permeability of the material used for the transformer core. For this reason, until now sintered MnZn-ferrite cores having a maximum initial, relative permeability have been used in transformers to minimize the overall losses.

Experiments leading to the invention have shown that the contributions to the overall losses in the MHz-frequency range are of a completely different composition than the contributions in the kHz-frequency range. As stated above, in the latter frequency range the hysteresis losses constitute the largest part of the overall losses. In the MHz-frequency range, however, the largest contribution to the overall losses is made by residual losses into which so far relatively little investigations have been conducted. For example, at 2 MHz 80% of the overall losses are residual losses. Further, it has been found that the extent of the residual losses is proportional to the initial, relative permeabilty. Consequently, transformer cores having low overall losses in the MHz-frequency range are obtained when the initial, relative permeability of the material of the core is relatively low, i.e. below 1000.

A preferred embodiment of the transformer core according to the invention is characterised in that the sintered ferrite material has an average particle size which ranges between 0.05 $\mu$m and 2.0 $\mu$m. The grain size of the ferrite material can be adjusted by means of measures which are known per se. In this connection, important factors are the grain size of the starting powder to be sintered, the sintering temperature and the sintering time. The initial, relative permeability of the MnZn-ferrite material is determined to an important degree by the grain size. It is noted, that the initial, relative permeabilty is not unequivocally correlated with the grain size. For example, it is possible to manufacture sintered ferrite material having a grain size which is larger than 2 $\mu$m, while the ferrite material still has an initial, relative permeability which ranges between 10 and 1000. This low permeabilty can be obtained by providing a relatively large magnetocrystalline anisotropy. In this case, however, the residual losses are not optimally low. It appears that the residual losses are additionally reduced as a result of the selected grain size of 0.05-2 $\mu$m. An average grain size smaller than 0.05 $\mu$m leads to an initial, relative permeability of the sintered MnZn-ferrite material which is smaller than 10. This brings about impermissibly large radiation losses in transformer cores of said material. Average grain sizes larger than 2.0 $\mu$m bring about an initial, relative permeability larger than 1000. Transformer cores having such a high initial, relative permeabilty exhibit impermissibly large overall losses at any frequency in the MHz-frequency range of 2 MHz and higher. In view of the losses it is also important for the grain size in the sintered core to be uniform.

In a further interesting embodiment of the transformer core according to the invention, the sintered ferrite material is defined by the formula $$Mn_aZn_bFe_{2+c}O_{4+\delta}$$

where
$0.05 \leq a \leq 0.5$
$0.06 \leq b \leq 0.4$
$0.34 \leq c \leq 0.9$
$a+b+c=1.$
$-0.05 \leq \delta \leq +0.05.$ Transformer codes according to this favourable embodiment exhibit an extremely high saturation magnetization ($B_s$). This saturation magnetization is 0.6T or more. A high saturation magnetization is favourable in transformer cores. At a given frequency and initial, relative permeability, the residual losses of a core having a high $B_s$ are lower than in the case of a core having a low $B_s$.

A further advantageous embodiment of the transformer core according to the invention is characterised in that the sintered ferrite material is defined by the formula $$Mn_aZn_bFe_{2+c}O_{4+\delta}$$

where
$0.3 \leq a \leq 0.80$
$0.10 \leq b \leq 0.60$
$0.02 \leq c \leq 0.20$
$a+b+c=1.$
$-0.05 \leq \delta \leq +0.05.$ For this composition range it holds that the magnetic anisotropy ($K_1$) of the sintered MnZn-ferrite material is substantially equal to 0. By virtue thereof, the values of the initial, relative permeability in the range of 10-1000 can be realised in a simple manner.

It is noted, that a small portion of Fe in the MnZn-ferrite material can be replaced by Co. It is also possible to add auxiliary sintering means such as CaO and/or SiO$_2$ to the material.

The invention also relates to a transformer comprising a primary coil, a transformer core and a secondary coil, as well as a high-frequency switch for transforming a direct voltage on the primary coil into a square-wave voltage. This transformer comprises a sintered transformer core of MnZn-ferrite material according to the invention. Said transformer is termed switched-mode power supply (SMPS). The transformer cores according to the invention can be used very advantageously in said transformer.

BRIEF DESCRIPTION OF THE DRAWING

Embodiments of the invention will be explained by means of examples and the accompanying drawing, in which.

DESCRIPTION OF THE PREFERRED EMBODIMENTS

Figure 1:
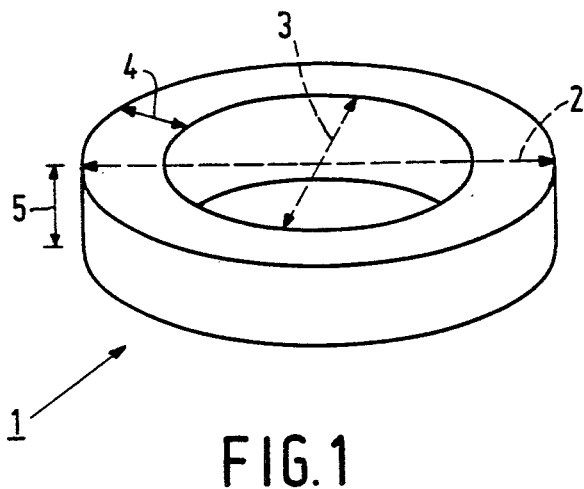
FIG. 1 is a perspective elevational view of a transformer core according to the invention.

FIG. 1 shows an annular transformer core 1 having an outside diameter 2 ($\phi_o$) of 5 mm and an inside diameter 3 ($100_i$) of 3 mm. The width 4 and the height 5 of the ring were 1 mm. The core may also have a different shape. The transformer core consisted of sintered MnZn-ferrite material the composition of which corresponds to the formula $Mn_{0.65}Zn_{0.30}Fe_{2.05}O_{4+\delta}$. The transformer core may also have a composition which corresponds to the formula $Mn_{0.36}Zn_{0.25}Co_{0.002}Fe_{2.39}O_{4+\Delta}$.

The transformer core 1 was manufactured from a co-precipitated ferrite powder. The preparation of this powder is described in U.S. Pat. No. 3,822,210. A powder having the intended composition of the core was successively sedimented, compacted into the intended shape and sintered in an equilibrium oxygen mixture. This is to be understood to mean that the partial oxygen pressure of the sinter atmosphere and the partial oxygen pressure of the ferrite compositions are substantially equal. In this manner, a number of the above-mentioned transformer cores, having different average grain sizes, were manufactured by varying the sintering temperature (650°–1250° C.) and the sintering time (0–8 hours). The grain size of the sintered cores was determined by the so-called mean-intercept-method. The listed grain sizes are calculated by multiplying the measured values by $0.5\pi$. In all cases, the densities were higher than 95% (exceeding 4.9 g/cm$^3$) of the theoretical maximum density.

TABLE 1

| Example | $\mu_i$ | $\bar{d}$ | P 2 MHz | 3 MHz | 10 MHz | 20 MHz |
|---------|---------|-----------|---------|-------|--------|--------|
| a | 2000 | 9 | 390 | 410 | 800 | 650 |
| b | 1200 | 2.7 | 230 | 240 | 750 | 650 |
| 1 | 800 | 2.0 | 65 | 60 | 650 | 700 |
| 2 | 600 | 1.6 | 100 | 80 | 1000 | 625 |
| 3 | 500 | 1.0 | 100 | 90 | 450 | 650 |
| 4 | 350 | 0.7 | 150 | 110 | 175 | 600 |
| 5 | 200 | 0.4 | 210 | 140 | 150 | 200 |
| 6 | 100 | 0.2 | 300 | 250 | 300 | 160 |

Table 1 lists data of a number of transformers manufactured in the above-mentioned manner. Exemplary embodiments 1–6 are in accordance with the invention. Comparative examples a and b are not in accordance with the invention. The measured data refer to the initial, relative permeability $\mu_i$, measured at 4 kHz and 25° C. and an induction of less than 1 mT, the average grain size d ($\mu$m) as measured by means of the so-called mean-intercept method and the overall losses P (mW/cm$^3$). The overall losses are determined at 2 MHz (induction 15 mT), at 3 MHz (induction 10 mT), at 10 MHz (induction 5 mT) and at 20 MHz (induction 2.5 mT). The measurements of the overall losses were carried out at 25° C.

The table clearly shows that in the frequency range of 2 MHz and higher, the transformer cores having an initial, relative permeability in the range between 10 and 1000 exhibit relatively low overall losses. It has been found that the transformer codes according to the invention exhibit minimum overall losses at a specific frequency in the indicated MHz-range. Said frequency predominantly depends on the initial, relative permeability. Also, the magnitude of the induction is of some influence. For example, it has been found that at frequencies of approximately 3 MHz, the cores having an initial permeability of 500–800 yield the best results. At frequencies of approximately 10 MHz, however, the cores having initial permeabilities in the range of 200–350 exhibit the lowest overall losses. Owing to their large overall losses, transformer cores having too large an average grain size (comparative examples a and b) are unsuitable for use in the frequency range of 2 MHz and higher. With this type of cores no frequency can be found in said frequency range at which the overall losses are smaller than 200 mW/cm$^3$.

Figure 2:
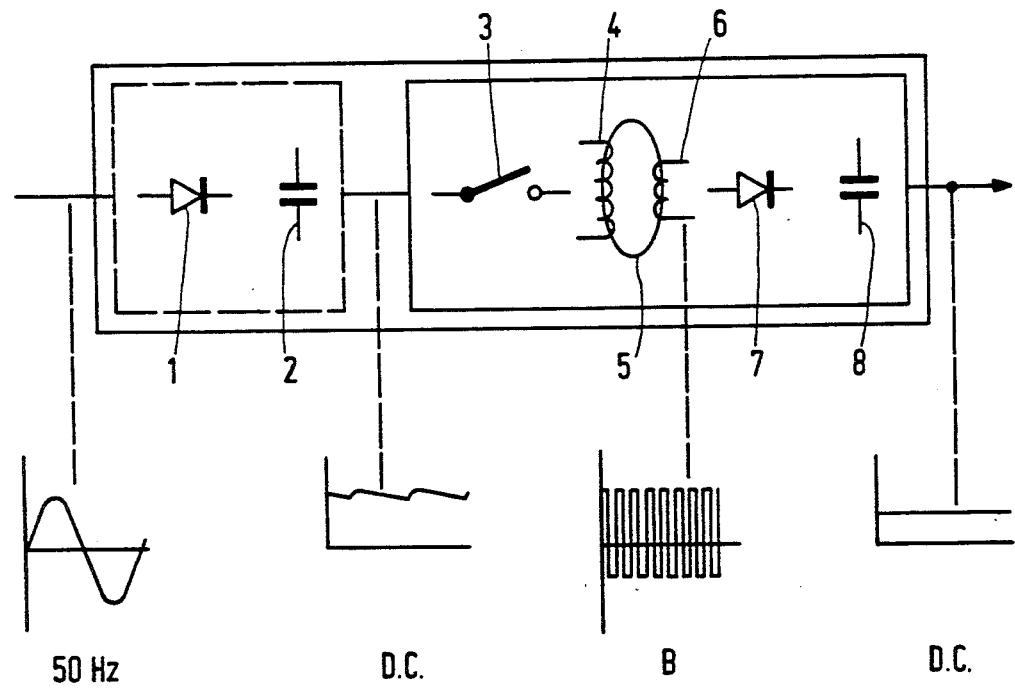
FIG. 2 is a schematic diagram of a switched-mode power supply (SMPS) comprising a transformer core according to the invention.

FIG. 2 shows a schematic diagram of a transformer of the switched-mode power supply (SMPS) type in which the transformer core according to the invention can be advantageously used. In said transformer, the mains input voltage (50 Hz) is first rectified with a rectifier (1) and then smoothed with a capacitor (2). Said d.c. voltage is transformed into a square wave B by means of a switch (3) (switching transistor) having very high frequencies of 2–20 MHz. Said square wave is applied to the primary coil (4) of the transformer core (5). The transformed square wave signal which is formed at the secondary coil (6) of the transformer core (5) is subsequently rectified by a rectifier (7), and then smoothed with a capacitor (8). In this manner, a d.c. voltage of the desired value is obtained.

We claim:

1. A sintered transformer core of MnZn-ferrite material, characterised in that the initial, relative permeability of the sintered ferrite material ranges between 10 and 1000, and in that at a frequency in the range of 2 MHz and higher and at f.B-product of at least 30 mT.MHz the overall losses are smaller than 200 mW/cm$^3$.

2. A transformer core as claimed in claim 1, characterised in that the sintered ferrite material has an average particle size which ranges between 0.5 μm and 2.0 μm.

3. A transformer core as claimed in claim 2, characterised in that the sintered ferrite material is defined by the formula $$Mn_aZn_bFe_{2+c}O_{4+\delta}$$

where
$0.05 \leq a \leq 0.5$
$0.06 \leq b \leq 0.4$
$0.34 \leq c \leq 0.9$
$a+b+c=1$.
$-0.05 \leq \delta \leq +0.05$.

4. A transformer core as claimed in claim 2, characterised in that the sintered ferrite material is defined by the formula $$Mn_aZn_bFe_{2+c}O_{4+\delta}$$

where
$0.3 \leq a \leq 0.80$
$0.10 \leq b \leq 0.60$
$0.02 \leq c \leq 0.20$
$a+b+c=1$.
$-0.05 \leq \delta \leq +0.05$.

5. A transformer comprising a primary coil, a transformer core and a secondary coil, as well as a high-frequency switch for transforming a direct voltage on the primary coil into a square-wave voltage, characterised in that the transformer comprises a sintered transformer core of MnZn-ferrite material as claimed in claim 1.

* * * * *